(12) United States Patent
Fan

(10) Patent No.: US 7,537,190 B2
(45) Date of Patent: May 26, 2009

(54) HOLDING DEVICE FOR ELECTRONIC APPARATUS

(76) Inventor: Eagle Fan, No. 133, Cheng-Kung 6 St., Chu-Pei City, Hsinchu (TW)

( * ) Notice: Subject to any disclaimer, the term of this patent is extended or adjusted under 35 U.S.C. 154(b) by 574 days.

(21) Appl. No.: 11/423,707

(22) Filed: Jun. 13, 2006

(65) Prior Publication Data

US 2007/0284500 A1 Dec. 13, 2007

(51) Int. Cl.
*A47F 5/00* (2006.01)
(52) U.S. Cl. .............. 248/309.1; 248/346.06; 379/426
(58) Field of Classification Search .............. 248/309.1, 248/231.21, 176.3, 346.06; 379/426, 446, 379/454, 455; 224/269, 483, 570, 929; 455/575.1; 74/89.17, 109
See application file for complete search history.

(56) References Cited

U.S. PATENT DOCUMENTS 5,555,302 A * 9/1996 Wang ........................ 379/446
7,272,984 B2 * 9/2007 Fan ........................ 74/89.17
2004/0056163 A1 * 3/2004 Holland ...................... 248/307
2005/0236536 A1 10/2005 Fan .......................... 248/176.3
2006/0278788 A1 * 12/2006 Fan ......................... 248/309.1

* cited by examiner

*Primary Examiner*—Korie Chan

(57) ABSTRACT

A holding device is provided, including a seat affixed with two clamping pieces. At least one of the clamping pieces can slide transversely towards or backwards from the other. Inside the seat, a gear set, a stop unit and a manual unit are included so that clamping pieces can synchronously slide. The slide-close movement of the clamping pieces is not hampered, while the automatic slide-open movement of the clamping pieces is hampered, which can only be activated by manual unit. In addition, a gradual open mode is used for opening the clamping pieces to release the clamped apparatus. The present invention provides a noise-free and convenient operation.

10 Claims, 11 Drawing Sheets

US 7,537,190 B2

HOLDING DEVICE FOR ELECTRONIC APPARATUS

FIELD OF THE INVENTION

The present invention generally relates to a holding device for electronic apparatus, and more specifically to a holding device with a manual gradual open mode, applicable to a plurality of electronic apparatuses.

BACKGROUND OF THE INVENTION

A holding device is mainly used in a vehicle for holding an electronic apparatus, such as mobile phone, PDA, and so on. The conventional holding device includes two moveable clamping pieces. The holding device also includes springs to provide the force to move the two moveable clamping pieces transversely to each other. The holding device further includes a set of stop pieces to control and lock the clamping pieces to a certain position so that the electronic apparatuses of different sizes can dock fastened. The holding device also includes a release unit for releasing the stop pieces from the locking position so that the spring will force the moveable clamping pieces and release the electronic apparatus from the holding device. U.S. Pat. No. 5,305,381 disclosed a holding device of this design. However, a holding device of this design has the following disadvantages:

1. Noise: When the release unit unlocks the stop pieces from the locking position, the spring will force the clamping pieces to the snap and stop at a pre-determined position. The snapping and stopping incurs the clashing of the clamping pieces at the pre-determined position, which will generate loud sound.

2. Inconvenience: Usually the pre-determined position at the push of the release unit is too wide apart. The current products usually allow larger space between clamping pieces as to hold electronic apparatus of various sizes. However, for holding small-sized electronic apparatus, the snapping of the clamping pieces to a wide-apart pre-determined position may cause the small-sized electronic apparatus to fall off the seat of the holding device.

Therefore, it is important to provide improvement over the conventional holding device. Based on the design disclosed in the U.S. patent application Ser. No. 11/140,372 and the U.S. Publication No. 2005/0236536, an improved design of a holding device is provided.

SUMMARY OF THE INVENTION

The present invention has been made to overcome the above-mentioned drawbacks of conventional holding device for electronic apparatus. The primary object of the present invention is to provide a holding device with a manual gradual open mode. By using manual units, the clamping pieces can be opened with an appropriate width as to release the clamped electronic apparatus so that the electronic apparatus will not fall off the holding seat at the snapping of the clamping pieces and no noise will be generated.

Another object of the present invention is to provide a self-lock holding device for electronic apparatus. A moveable gear is used to move the clamping pieces to an appropriate width and lock the clamping pieces in position for convenience.

Yet another object of the present invention is to provide a holding device more suitable for actual use. Although a holding device with large space between the clamping pieces allows the application to a plurality of electronic apparatuses of difference sizes, the use, however, usually uses the holding device to hold a single electronic device at a time, such as a cell phone. Therefore, it is unnecessary to open the clamping pieces as wide as possible to release the clamped electronic apparatus. The present invention provides the adjustment to the widest open position at the initial use and the gradual release of the clamping pieces for convenience, which is suitable for actual use.

To achieve the above objects, the present invention provides a holding device including a seat affixed with two clamping pieces that can slide transversely. Inside the seat, a gear set, a stop unit and a manual unit are included so that clamping pieces can synchronously slide. The slide-close movement of the clamping pieces is not hampered, while the automatic slide-open movement of the clamping pieces is hampered, which can only be activated by manual unit. In addition, a gradual open mode is used for opening the clamping pieces to release the clamped apparatus.

The holding device of the present invention can also include a seat affixed with a fixture clamping piece and a clamping piece that can slide transversely. Inside the seat, a gear set, a stop unit and a manual unit are included so that sliding clamping pieces can slide. The inward sliding movement of the clamping piece is not hampered, while the automatic outward sliding movement of the clamping piece is hampered, which can only be activated by manual unit. In addition, a gradual open mode is used for opening the clamping pieces to release the clamped apparatus.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
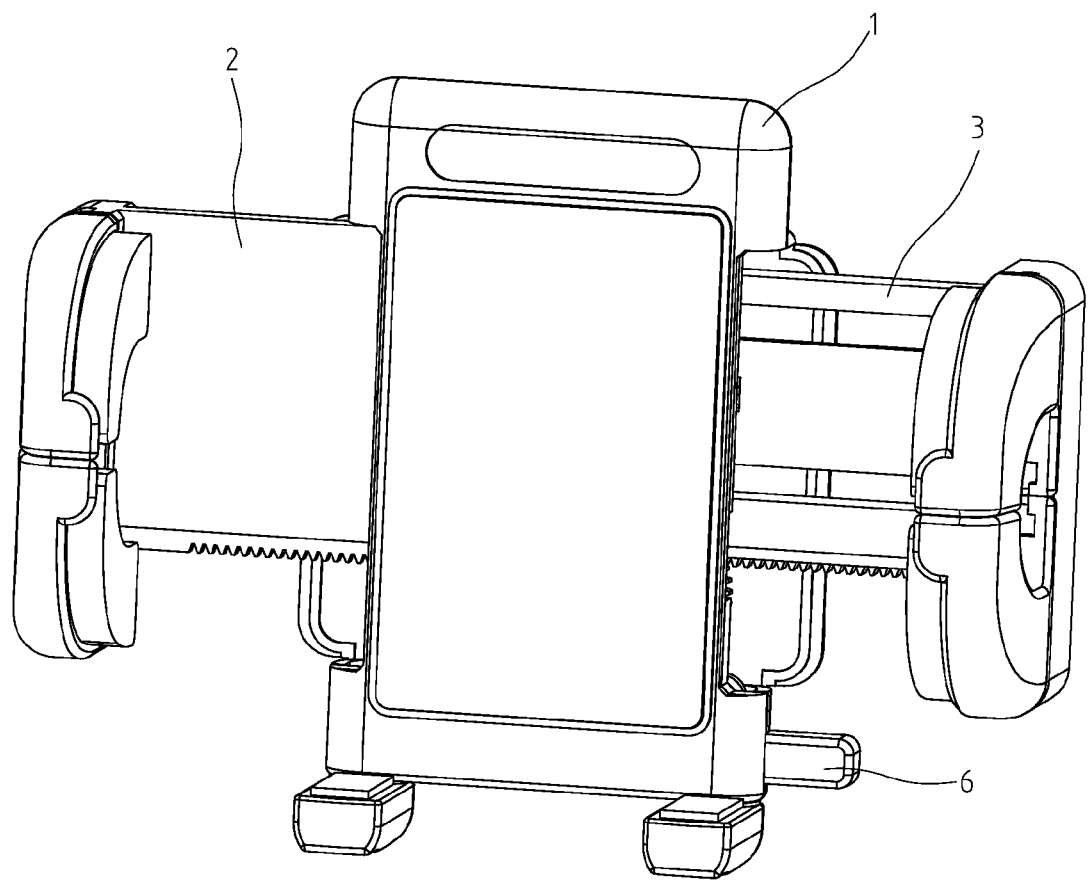
FIG. 1 shows a schematic view of the present invention.
Figure 2:
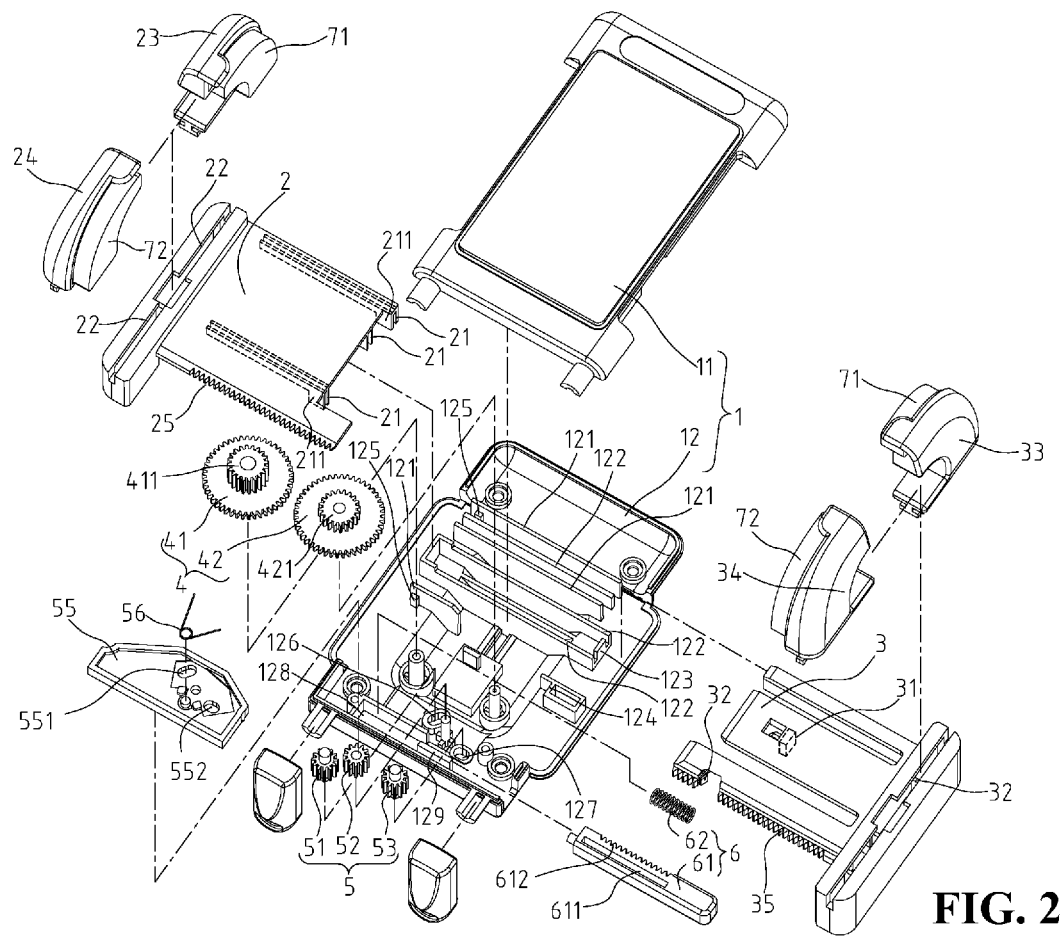
FIG. 2 shows an exploded view of the present invention.

FIGS. 1 & 2 show the schematic view and the exploded view of the present invention, respectively, including a seat 1, two clamping pieces 2, 3, a gear set 4, a stop unit 5, and a manual unit 6. Clamping pieces 2, 3 are affixtures to both sides of seat 1, and can slide transversely towards or backwards from each other for opening or clamping. Gear set 4 is hidden inside seat 1 so that clamping pieces can slide synchronously. Stop unit 5 is located on one side of gear set 4 as to prevent clamp pieces 2, 3 from automatically sliding outward to open. On the other hand, when clamping pieces 2, 3 slide towards each other, gear set 4 is locked does not hamper the sliding. Manual unit 6 is for releasing stop unit 5 from the locked position, and provides the force to gradually slide clamping pieces 2, 3 outward transversely to open up. The following describes the structure and the movement of the design.

Figure 3:
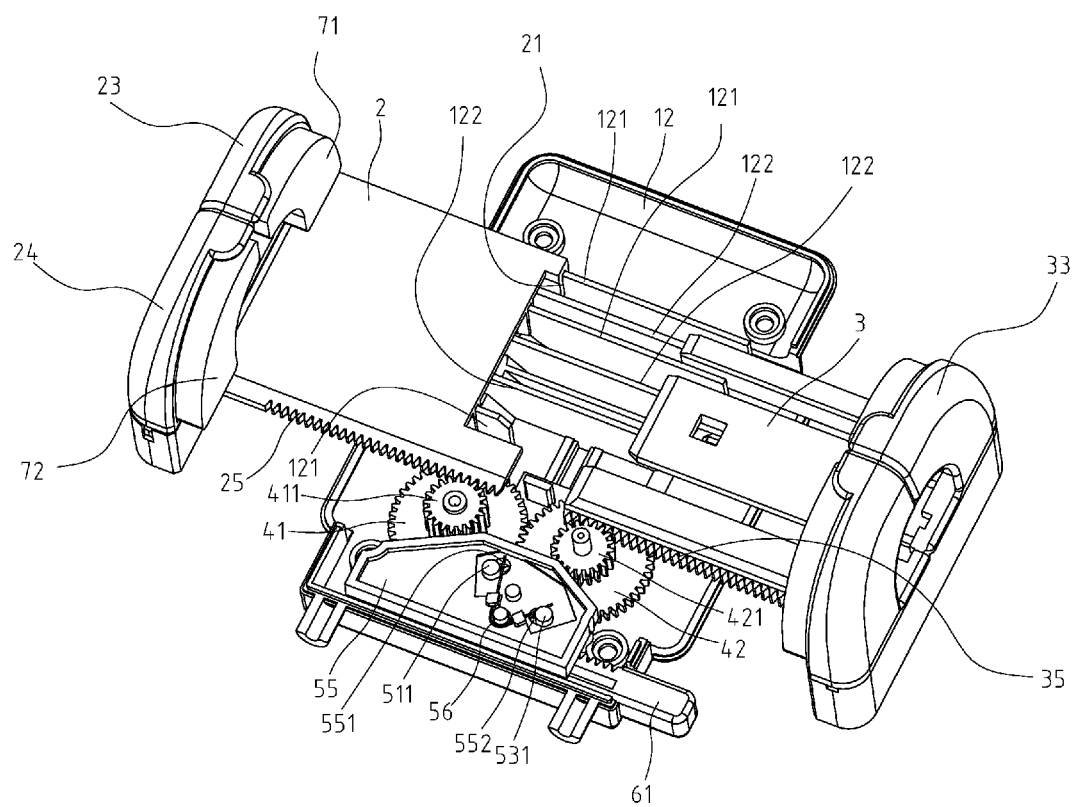
FIG. 3 shows a schematic view of the internal structure of the present invention after assembled.

FIGS. 2 & 3 shows the exploded view and the internal schematic view of the present invention, respectively. Seat 1 includes a top cover interlocking a bottom cover 12 so that one end of clamping pieces 2, 3, gear set 4, stop unit 5 and manual unit 6 are all hidden inside seat 1. Bottom cover 12 includes a plurality of racks 121, 122 of different height, parallel to each other. Clamping piece 2 includes a plurality of tracks 21 corresponding to racks 121. Clamping piece 3 also includes a plurality of tracks (not shown) corresponding to racks 122. Therefore, clamping pieces 2, 3 can slide on different height racks 121, 122 of bottom cover 12 without interfering each other.

As shown in FIG. 2, to prevent clamping pieces 2, 3 disengaged from seat 1, clamping piece 3 includes a protruding block 31, 32 at the bottom of one end. Protruding blocks 31, 32 will be blocked by stop plates 123, 124 of bottom cover 12 to avoid disengaging from seat 1 during sliding. The inner side of racks 121 of bottom cover 12 includes a protruding block 125. Track 21 of clamping piece 2 has a deeper front segment 211, and a shallower rear segment. When track 21 is placed on racks 121 and slides to the maximum open position, track 21 is stopped by protruding block 125 beneath front segment 211 so that clamping pieces 2, 3 will stay engaged to seat 1 during sliding.

As shown in FIG. 2, clamping pieces 2, 3 include a sliding track 22, 32, respectively so that clamping plates 23, 24, 33, 34 can slide on sliding tracks 22, 32 to change the clamping position. The inner side of each clamping plate 23, 24, 33, 34 includes soft resilient buffers 71, 72. In this embodiment, resilient buffers 71, 72 are made of foam. Resilient buffers 71, 72 are for protecting clamping surface from scratching clamped electronic apparatus, and improve the clamping effectiveness. A vertical surface on a side of clamping pieces 2, 3 includes a tooth rack 25, 35 so that clamping pieces 2, 3 can slide synchronously through gear set 4.

As shown in FIG. 3, gear set 4 is placed inside bottom cover 12. Gear set 4 includes a first gear 41 and a second gear 42, which further includes a co-axial small gear 411, 421, respectively. First gear 41 and second gear 42 are engaged with each other. Small gear 411 is engaged to tooth rack 25 of clamping piece 2, and small gear 421 is engaged to tooth rack 35 of clamping piece 3. Therefore, clamping pieces 2, 3 can slide transversely outward and inward synchronously.

Figure 4:
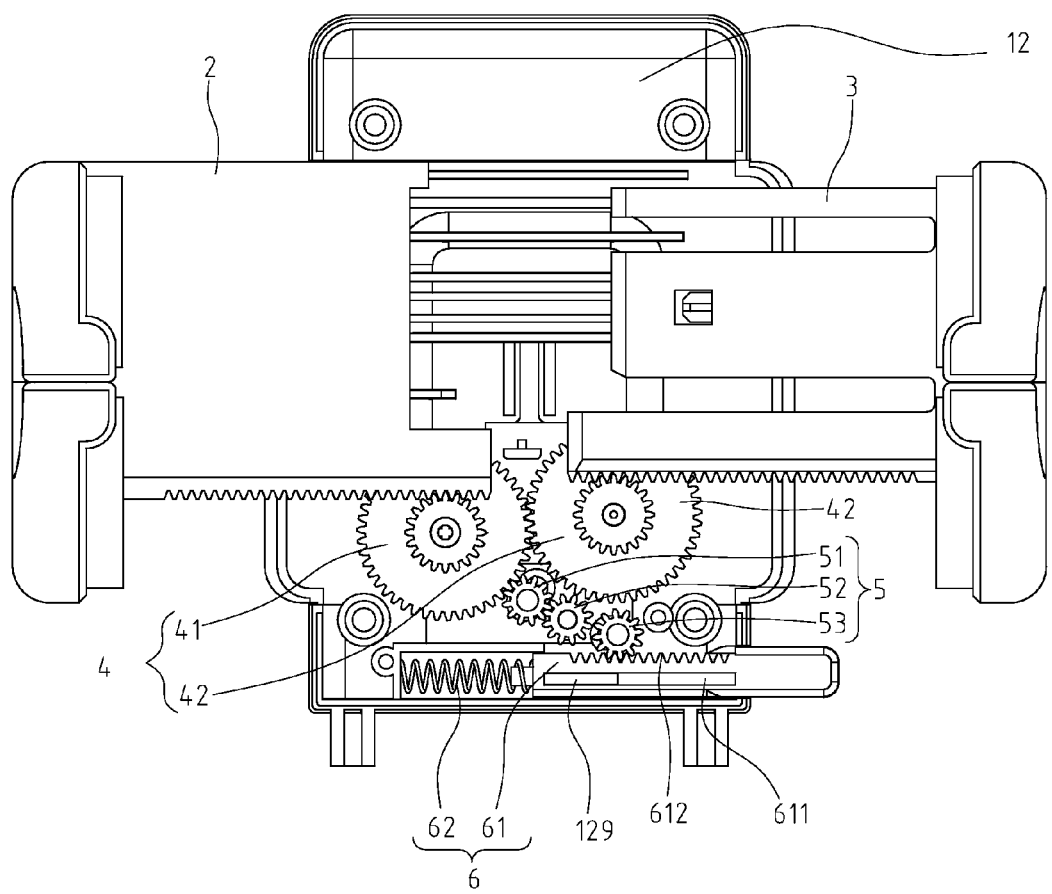
FIG. 4 shows a schematic view with the holding plate removed.

As shown in FIGS. 3 & 4, stop unit 5 is placed inside seat 1, on one side of gear set 4. The purpose of stop unit 4 is to prevent clamping pieces 2, 3 from automatically sliding outward, while allowing sliding inward to clamp the apparatus. Stop unit 5 includes a stop gear 51, a gear 52, and a moveable gear 53. Stop gear 51 can slide in a short arc. Stop gear 51 is generally engaged to only first gear 41 of gear set 4. When first gear 41 turns counter-clockwise, stop gear 51 slides a short distance in arc to the end position, and is engaged to first gear 41 and second gear 42 so as to stop both gears from further turning. Gear 52 is always engaged to stop gear 51.

Moveable gear 53 can move transversely, and is usually disengaged from gear 52. When manual unit 6 operates, moveable gear 53 moves to engage gear 52, and cause stop gear 51 from the stop position so that clamping pieces 2, 3 can slide outward. To ensure stop gear 51 and moveable gear 53 staying within the sliding range, as shown in FIG. 2, the inside of bottom cover 12 includes a first groove 126 and a second groove 127, facing each other. The top of bottom cover 12 includes holding plate 55. Holding plate 55 includes an arc groove 551 and lateral groove 552, as shown in FIG. 3. Arc groove 551 is for axis 511 of stop gear 51 to extend beyond, and lateral groove 552 is for axis 531 of moveable gear 53 to extend beyond. Holding plate 55 includes a resilient piece 56, with both ends slighted pressed to axis 511 and axis 531 so that stop gear 51 is in general engaged to one gear, and moveable gear 53 is disengaged. Resilient piece 56 is a resilient metal wire, and is only slightly pressed for contact. Therefore, all the pieces can overcome the resilience during the operation, and move to become engaged to respective gears.

As shown in FIGS. 2 & 4, manual unit 6 includes a push piece 61 that can move back and forth, and a resilient piece 62 placed on one side. This structure is placed inside housing groove 128 of bottom cover 12. A protruding block 129 extends into a groove 611 of push piece 61 so that push piece 61 can only move transversely to a pre-determined distance. The side of push piece 61 includes tooth rack 612, which is engaged to moveable gear 53 of stop unit 5. The push of push piece 51 can cause the rotation of engaged moveable gear 53 and gear 52 so as to achieve the gradual open mode.

Figure 5A:
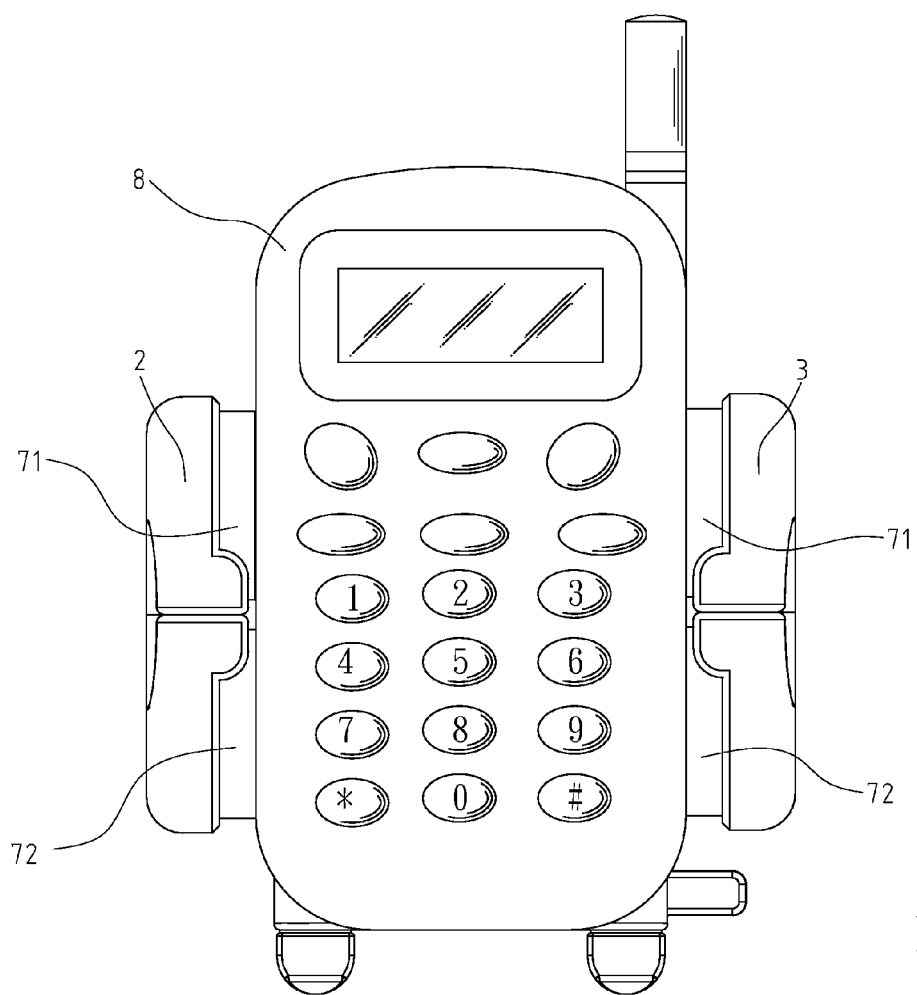
FIG. 5A shows a schematic view of an apparatus being clamped.
Figure 5B:
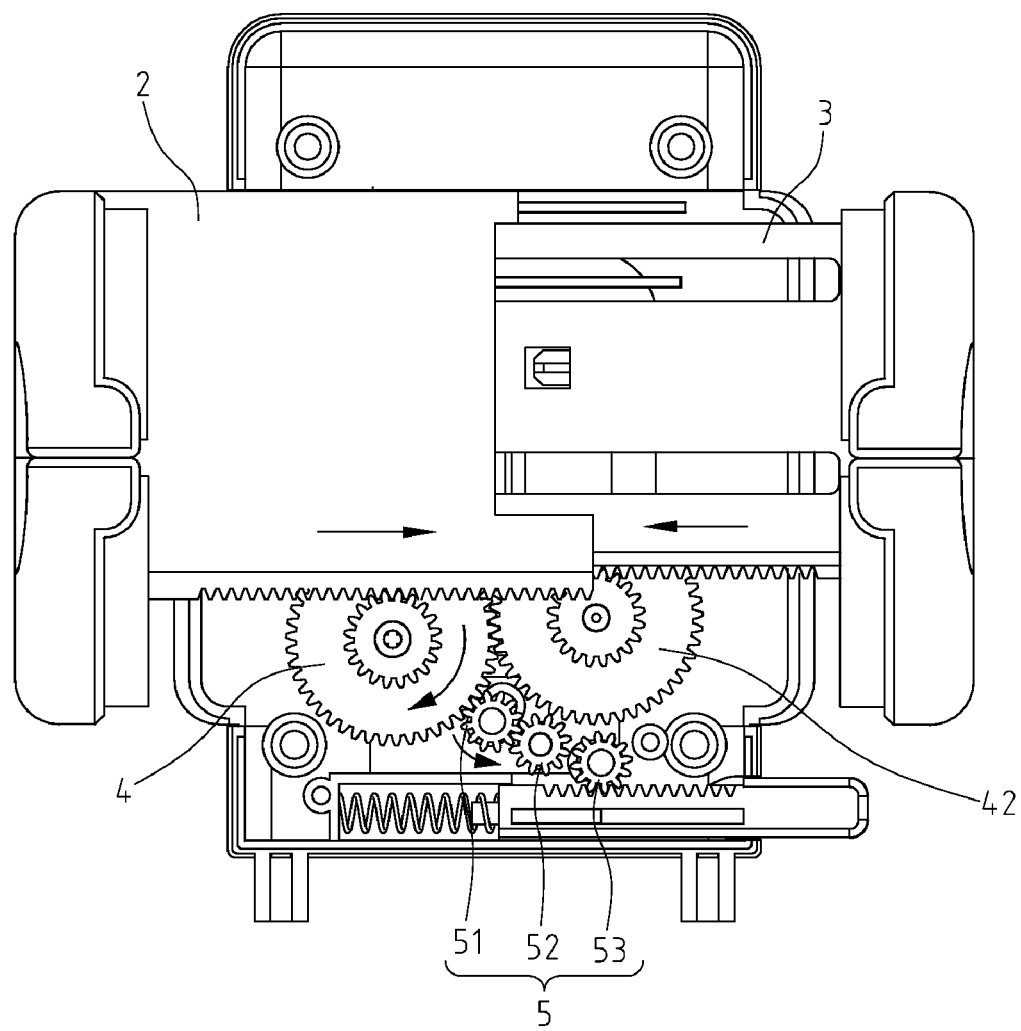
FIG. 5B shows a schematic view of the connected operation of FIG. 5A.

The following describes the overall operation. As shown in FIG. 4, for clamping an apparatus for the first time, clamping pieces 2, 3 can slide outward to the widest open position. As shown in FIG. 5A, the electronic apparatus is placed on seat 1, and clamping pieces 2, 3 are pushed inward to clamp the electronic apparatus. As shown in FGI. 5B, first gear 41 of gear set 4 is engaged to second gear 42 so that clamping pieces 2, 3 slide synchronously. In addition, stop gear 51 of stop unit 5 is released from the stop position due to the clockwise rotation of first gear 41 so that clamping pieces 2, 3 can clamp on both sides of the electronic apparatus.

Figure 6:
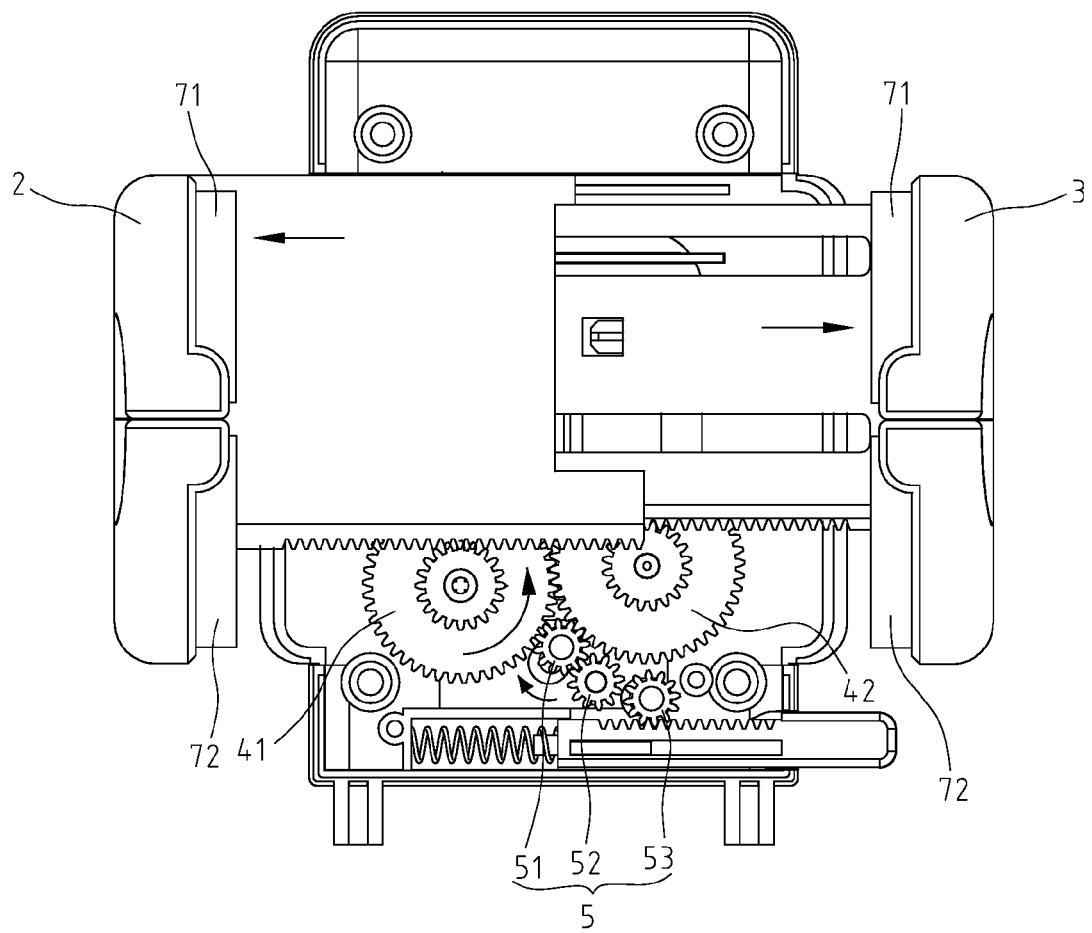
FIG. 6 shows a schematic view of the self-lock state of the present invention.

As shown in FIG. 6, clamping pieces 2, 3 clamp both sides of the electronic apparatus. If clamping pieces 2, 3 automatically slide outward to un-clamp the electronic apparatus, first gear 41 of gear set 4 will rotate counter-clockwise, and cause stop gear 51 of stop unit 5 to move to engage first gear 41 and second gear 42 so as to lock in the stop position. In this embodiment, because the holding plates of clamping pieces 2, 3 include resilient buffers 71, 72 (foam), resilient buffers 71, 72 will slightly deform during clamping the electronic apparatus. When the hand holding the electronic apparatus is removed (i.e., the external force is removed), the resilience will cause clamping pieces 2, 3 slide slightly outward to trigger the self-lock mechanism described earlier so as to ensure the holding. In other words, the design of the present invention prevents clamping pieces 2, 3 from automatically sliding outward to open up.

Figure 7A:
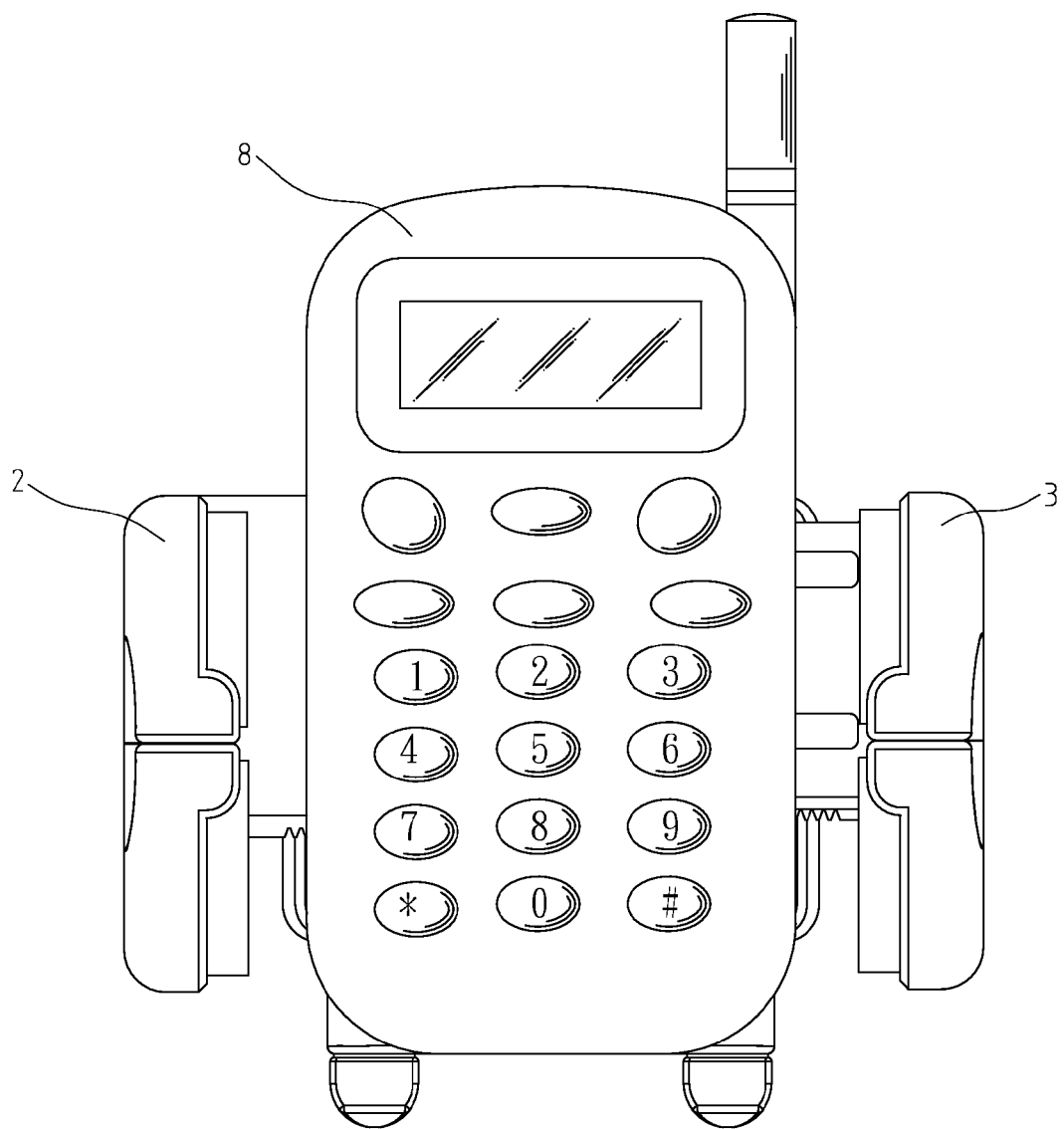
FIG. 7A shows a schematic view of the present invention when opened.
Figure 7B:
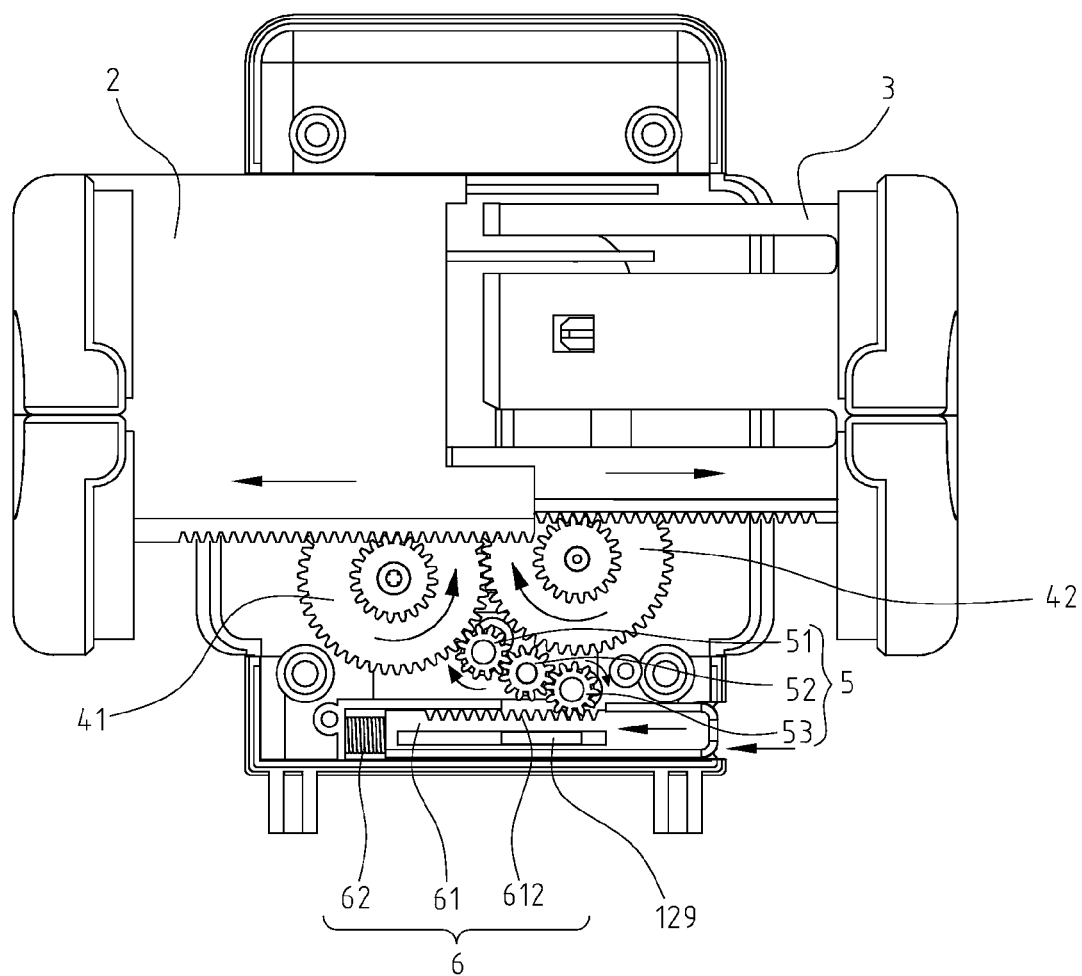
FIG. 7B shows a schematic view of the internal structure of FIG. 7A.

As shown FIGS. 7A & 7B, push piece 61 of manual unit 6 is pushed to release clamping pieces 2, 3 from the locking/clamping position. The push to push piece 61 will cause moveable gear 53 of stop unit 5 to move transversely and engage gear 52, which will then cause stop gear 51 to move from the stop/lock position. This causes first gear 41 of gear set 4 to rotate counter-clockwise to cause clamping pieces 2, 3 to open up a small distance to allow the retrieval of the electronic apparatus. When the hand is removed, push piece 61 and moveable gear 53 will be disengaged to the initial state due to the resilience. Then, it is unnecessary to open the clamping pieces to the widest open position when placing the electronic apparatus for the second time. The previous open range is sufficient to allow the placement of the electronic apparatus into the seat for clamping. When used for clamping a different size electronic apparatus, a repetition of pushing push piece 61 several times will adjust the clamping pieces to the widest open position.

Figure 8:
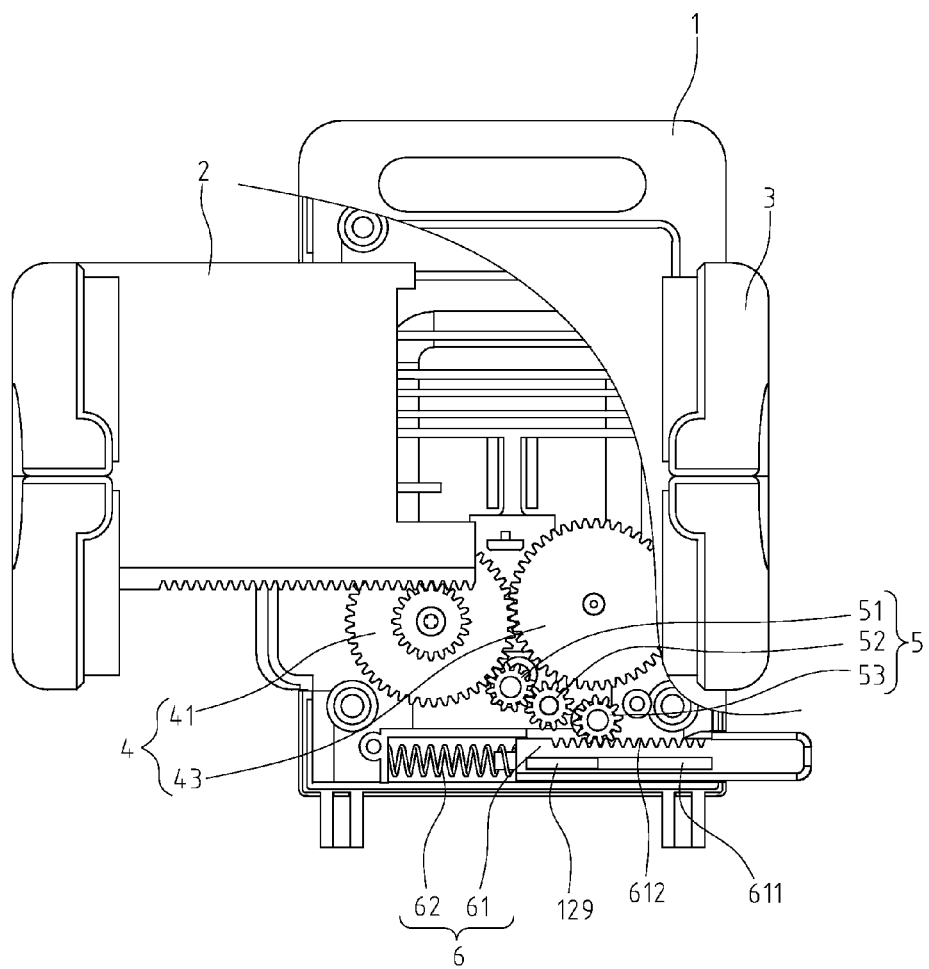
FIG. 8 shows the second embodiment of the present invention.

FIG. 8 shows a second embodiment of the present invention. The previous embodiment show synchronous sliding of both clamping pieces. The present embodiment only allows clamping piece 2 to move, while clamping piece 3 is fixed to seat 1. The internal structure include gear set 4, stop unit 5, and manual unit 6. Gear set 4 includes first gear 41 and third gear 43, and third gear 43 is only engaged to first gear 41 and not engaged to any other gears. The purpose is to allow stop unit 5o to reach the self-lock position. In other words, the present invention is also applicable to one-directional clamping.

Figure 9:
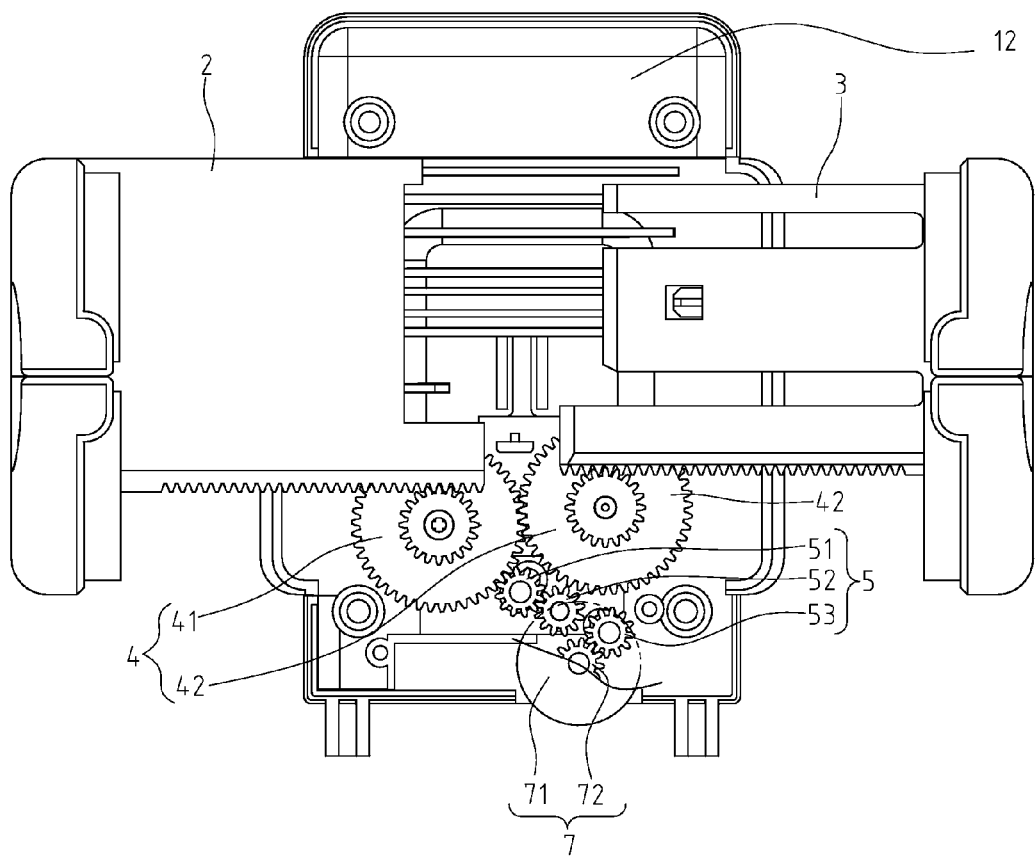
FIG. 9 shows the third embodiment of the present invention.

FIG. 9 shows the third embodiment of the present invention. This embodiment include a different design of a manual unit 7, including a turning wheel 71 partially exposed outside of seat 1, and a co-axial gear 72. Moveable gear 53 of stop unit 5 moves along an arc path, and is engaged to gear 72 of manual unit 7. To open clamping pieces 2, 3, turning wheel 71 is turned counter-clockwise so that gear 72 is engaged to moveable gear 53 for operation. In other words, the manual unit of the present invention is not limited to the operation by push, but can also be operated by turning.

In summary, the manual gradual opening mode of the holding device of the present invention allows the user to gradually open the clamping pieces after the initial clamping. This provides more convenient, less noisy, and smooth operation. The self-lock feature of the stop unit also effectively holds the clamped apparatus.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A holding device, comprising:
   a seat;
   at least two clamping pieces, being affixtures to said seat, able to slide transversely towards or backwards from each other for opening or clamping;
   a gear set, located inside said seat to enable said clamping pieces for synchronous sliding;
   a stop unit, located on one side of said gear set, further comprising at least a moveable stop gear for controlling said gear set to prevent said gear set from automatically sliding outward while allowing sliding inward; and
   a manual unit, located on one side of said stop unit, for releasing said stop unit from the prevention state so as to allow said gear set to slide outward.

2. The holding device as claimed in claim 1, wherein said clamping pieces further comprise resilient buffers.

3. The holding device as claimed in claim 2, wherein said resilient buffers are made of foam.

4. The holding device as claimed in claim 1, wherein said gear set comprises a first gear and a second gear, said first gear is engaged to said second gear, and both said first gear and said second gear have a smaller gear to engage to a tooth rack located at the end of one side of said clamping pieces.

5. The holding device as claimed in claim 4, wherein said stop unit further comprises a stop gear, a gear and a moveable gear, said stop gear is in general engaged to one gear of said gear set; when said clamping pieces automatically slide outward, said stop gear moves to engage said first gear and said second gear so as to stop said clamping pieces from further sliding outward; said gear is engaged to said stop gear, and said moveable gear can move transversely, and is disengaged from said gear except when said manual unit is operated to move to engaged to said gear.

6. The holding device as claimed in claim 5, wherein said seat further comprises a resilient piece inside so that said stop gear of said stop unit is in general engaged to one gear of said gear set.

7. The holding device as claimed in claim 5, wherein said seat further comprises a resilient piece inside so that said gear and said moveable gear of said stop unit are in general disengaged from each other.

8. The holding device as claimed in claim 1, wherein said manual unit comprises a moveable push piece and a resilient piece located on one side; said push piece comprises a tooth rack on one side to engage to said moveable gear of said stop unit.

9. The holding as claimed in claim 1, wherein said manual unit comprises a turning wheel partially exposed outside of said seat and a co-axial gear; said co-axial gear is engaged to said moveable gear of said stop unit; and said moveable gear can move along an arc path.

10. The A holding device, comprising:
    a seat;
    at least two clamping pieces, being affixtures to said seat, one said clamping piece being able to slide transversely towards or backwards from the other for opening or clamping;
    a gear set, located inside said seat to enable said clamping piece for sliding;
    a stop unit, located on one side of said gear set, further comprising at least a moveable stop gear for controlling said gear set to prevent said gear set from automatically sliding outward while allowing sliding inward; and
    a manual unit, located on one side of said stop unit, for releasing said stop unit from the prevention state so as to allow said gear set to slide outward.

\* \* \* \* \*